United States Patent
Portune

(10) Patent No.: US 7,956,625 B1
(45) Date of Patent: Jun. 7, 2011

(54) UNDOPED SILICON HEAT SPREADER WINDOW

(75) Inventor: Richard A. Portune, Sunnyvale, CA (US)

(73) Assignee: DCG Systems, Inc., Fremont, CA (US)

( * ) Notice: Subject to any disclaimer, the term of this patent is extended or adjusted under 35 U.S.C. 154(b) by 1243 days.

(21) Appl. No.: 11/591,421

(22) Filed: Oct. 31, 2006

(51) Int. Cl.
  *G01R 31/10* (2006.01)
(52) U.S. Cl. .................................. 324/750.09
(58) Field of Classification Search ............. 324/158.1, 324/751–753, 760; 850/13–15
  See application file for complete search history.

(56) References Cited

U.S. PATENT DOCUMENTS

| | | | | |
|---|---|---|---|---|
| 4,427,891 A | * | 1/1984 | Georges et al. | 250/443.1 |
| 5,047,637 A | * | 9/1991 | Toda | 850/1 |
| 5,895,972 A | * | 4/1999 | Paniccia | 257/706 |
| 6,140,141 A | * | 10/2000 | Davidson | 438/16 |
| 6,251,706 B1 | * | 6/2001 | Paniccia | 438/122 |
| 6,496,468 B2 | * | 12/2002 | Hajjar et al. | 369/13.33 |
| 6,621,275 B2 | * | 9/2003 | Cotton et al. | 324/537 |
| 6,818,472 B1 | * | 11/2004 | Fan et al. | 438/106 |
| 7,369,030 B2 | * | 5/2008 | Darr | 337/243 |
| 7,733,100 B2 | * | 6/2010 | Kasapi | 324/754.22 |

\* cited by examiner

*Primary Examiner* — Ha Tran T Nguyen
*Assistant Examiner* — Joshua Benitez
(74) *Attorney, Agent, or Firm* — Nixon Peabody LLP.; Joseph Bach, Esq.

(57) ABSTRACT

A system and method for thermal management of a device under test (DUT). In particular, a system is described for performing optical microscopy. The system includes a heat spreader window that consists of substantially undoped silicon. The window is configured to be coupled to a back side of a substrate of a DUT such that thermal energy from the DUT is spread to the heat spreader window. A contact region is coupled to the heat spreader window. The contact region is configured for contact with a solid immersion lens (SIL) optical system for optical examination of the DUT. A heat exchanger is coupled to the heat spreader window for removing the thermal energy from the DUT during its operation, wherein the heat exchanger is configured to allow access to the heat spreader window.

15 Claims, 7 Drawing Sheets

UNDOPED SILICON HEAT SPREADER WINDOW

TECHNICAL FIELD

Embodiments of the present invention relate to cooling of devices under test. More specifically, embodiments of the present invention are related to the thermal management of a device under test in systems that implement solid immersion lens optical systems for performing infrared microscopy.

BACKGROUND ART

The testing of digital circuits of a device under test (DUT) while under a functional system test requires cooling of the DUT during its operation. A DUT can consume up to 200 watts of power or more during its operation. As such, dissipation and removal of the thermal energy produced during testing is essential to adequately test the DUT under normal operating conditions.

Thermal solutions currently exist for infrared optical sensor system that use air-coupled optics exclusively. For instance, diamond window heat spreaders can be used in conjunction with heat exchangers to provide optical access to a back side of a DUT during this operation while removing the thermal energy generated by the DUT. The diamond window heat spreaders use a thin sheet of diamond window material mounted to a metal heat exchanger to allow optical inspection of a DUT while the device operates under full power. Such systems are suitable for air-coupled optical inspections systems.

However, diamond window heat spreader technology is not compatible with some forms of optical imaging systems. For instance, the use of the diamond window heat spreader technology is not compatible with solid immersion lens (SIL) optical sensors. Specifically, the use of the diamond window heat spreader introduces optical aberrations when using a SIL objective lens of an SIL optical system.

SUMMARY OF THE INVENTION

A system and method for thermal management of a device under test (DUT). In particular, a system is described for performing optical microscopy. The system includes a heat spreader window that consists of substantially undoped silicon. The window is configured to be coupled to a back side of a substrate of a DUT such that thermal energy from the DUT is spread to the heat spreader window. A contact region is coupled to the heat spreader window. The contact region is configured for contact with a solid immersion lens (SIL) optical system for optical examination of the DUT. A heat exchanger is coupled to the heat spreader window for removing the thermal energy from the DUT during its operation, wherein the heat exchanger is configured to allow access to the heat spreader window.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE INVENTION

Reference will now be made in detail to the embodiments of the present invention, a system and method for thermal management of a DUT. While the invention will be described in conjunction with the embodiments, it will be understood that they are not intended to limit the invention to these embodiments.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Accordingly, embodiments of the present invention disclose systems and methods that provide for thermal management of a DUT through the implementation of a substantially undoped silicon heat spreader window for use with a solid immersion lens (SIL) optical system. Other embodiments of the present invention provide the above accomplishments and also provide for increased efficiency in collecting infrared (IR) signals emitted from the DUT during its operation since the index of refraction of the heat spreader window is substantially identical to the indexes of refraction for the substrate of the DUT and the SIL objective lens of the SIL optical system.

Figure 1A:
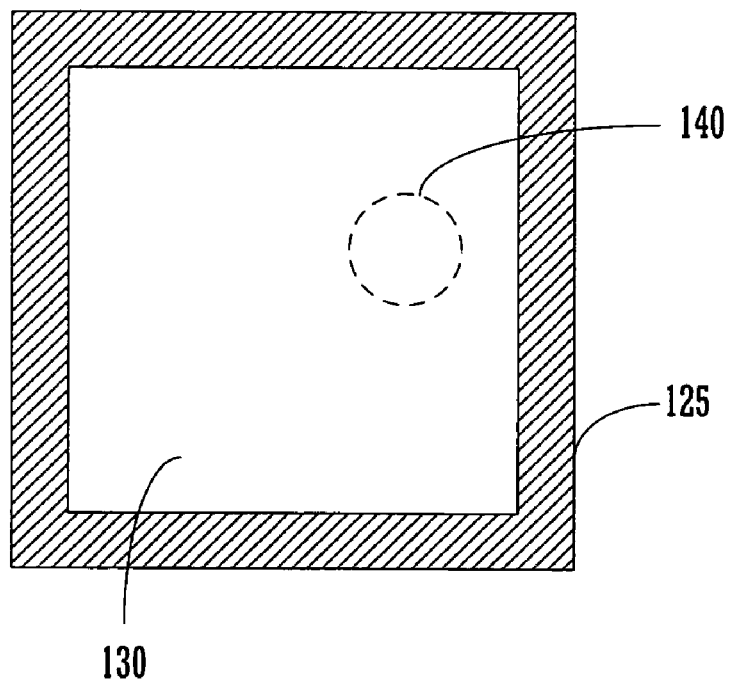
FIG. 1A is an illustration of the substantially undoped silicon heat spreader window, in accordance with one embodiment of the present invention.

FIG. 1A is an illustration of a heat spreader window 100, in accordance with one embodiment of the present invention. The heat spreader window 100 is configured for use within a system for performing optical microscopy. In particular, the heat spreader window 100 is configured for use within an SIL optical system, in one embodiment.

The heat spreader window 100 comprises substantially undoped silicon, in one embodiment. That is the heat spreader window area 130 of the heat spreader window 100 comprises substantially undoped silicon and is optically transparent (e.g., transparent to infrared [IR] wavelengths). Heat spreader window 100 comprises a heat spreader window area 130. For purposes of illustration, heat spreader window 100 is used generally throughout the body of the specification to describe the thermal transfer of heat from the DUT through the heat spreader window 100 to a heat exchanger. However, the term and component heat spreader window area 130 can be used interchangeably with the term heat spreader window 100 to describe the thermal transfer of heat from the DUT through the heat spreader window area 130 to the heat exchanger.

In one embodiment, the thickness of the heat spreader window area 130 of the heat spreader window 100 is configured so that it is optically transparent and thermally conductive for purposes of embodiments of the present invention. In one embodiment, the thickness of the heat spreader window area 130 of heat spreader window 100 is approximately 300 micrometers. However, it is to be understood that in other embodiments of the present invention, varying thicknesses of the heat spreader window 100 by design are suitable for optical transparency and for removing thermal heat from a DUT through the heat spreader window 100.

In addition, the heat spreader window 100 is configured to be coupled to a back side of a substrate of a device under test (DUT) such that thermal energy from the DUT is spread to the heat spreader window 100. Specifically, through thermal coupling, thermal energy form the DUT, while in operation, is transferred from the DUT to the heat spreader window 100.

In one embodiment, an anti-reflective coating (ARC) (not shown) is coupled to heat spreader window 100. For instance, the ARC comprises a thin film that is layered or coated on a surface of heat spreader window area 130. The ARC reduces reflections due to heat spreader window area 130.

The heat spreader window 100 also comprises a contact region 140 that is coupled to the heat spreader window area 130. In particular, contact region 140 is configurable for contact with a SIL optical system for optical examination of the DUT. More particularly, the contact region 140 is configured for contact with an SIL objective lens of the SIL optical system for optical examination of the DUT.

Contact region 140 is moveable in heat spreader window area 130 of the heat spreader window 100. That is, optical examination of any part of the DUT is accomplished by moving the SIL objective lens that is in contact with the contact region 140. This effectively moves contact region 140 throughout the heat spreader window area 130. As such, an SIL infrared optical system that is coupled to said contact region 140 is able to receive IR energy for purposes of analyzing and testing the DUT.

In another embodiment, the heat spreader window 100 is configurable for use with any air coupled optical system. That is, the air-coupled optical system need not contact the heat spreader window 100 and is configured to receive energy from the DUT through the heat spreader window during operation of the DUT.

In addition, the heat spreader window 100 comprises a heat conductive plating 125 that is coupled to the heat spreader window area 130. The heat conductive plating 125 is for purposes of thermally coupling the heat spreader window 100 to a heat exchanger, described below in relation to FIG. 1B. In one embodiment, the heat conductive plating 125 comprises gold material. For example, the heat conductive plating 125 is coupled to the heat exchanger using indium solder, in one embodiment.

Figure 1B:
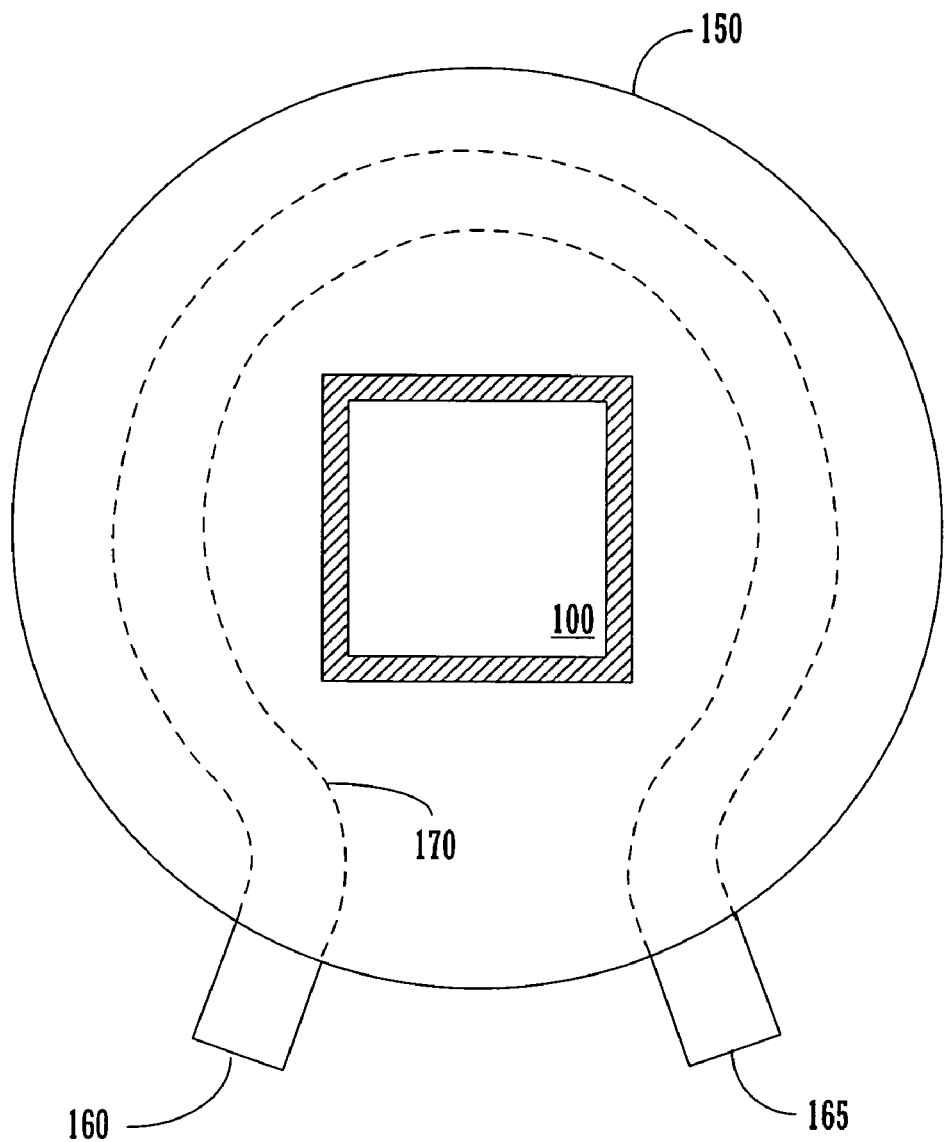
FIG. 1B is a block diagram of a heat exchanger coupled to the substantially undoped silicon heat spreader window of FIG. 1A, in accordance with one embodiment of the present invention.

FIG. 1B is a block diagram of a heat exchanger 150 that is coupled to the substantially undoped silicon heat spreader window 100 of FIG. 1A, in accordance with one embodiment of the present invention. In particular, the heat exchanger 150 is coupled to the heat spreader window 100 for removing thermal energy from the DUT while under power, during its operation. More specifically, heat exchanger 150 is coupled to the heat conductive plating 125 in order to thermally couple heat spreader window 100 to the heat exchanger 150.

In addition, heat exchanger 150 is configured to allow access to heat spreader window 100. That is, heat exchanger 150 is configured such that an optical lens (e.g., SIL optical lens) is capable of coming into close contact or contact with window area 130 of heat spreader window 100.

As shown in FIG. 1B, the heat exchanger 150 comprises example ports 160 and 165. Ports 160 and 165 are coupled to channel 170, which is internal to the heat exchanger 150. Ports 160 and 165 allow for thermal energy, transferred from heat spreader window 100 to heat exchanger 150, to be removed from heat exchanger 150. For example, cooled air, or liquid is circulated through channel 170 to remove thermal energy from heat exchanger 150. While embodiments of the present invention as shown in FIG. 1B describe heat exchanger 150 with two ports 160 and 165 and one channel 170, it is understood that other embodiments of the present invention are well suited to a heat exchanger having any number of ports with any number of channels for removing thermal energy generated by a DUT.

Figure 2A:
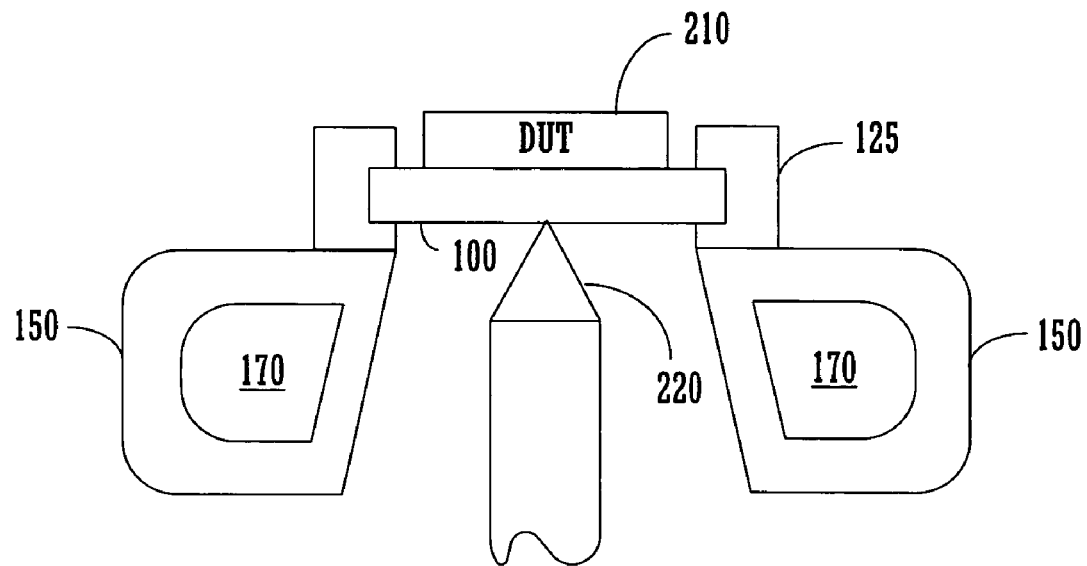
FIG. 2A illustrates a cross-sectional view of the configuration of spreader window 100 and thermal exchanger 150 illustrated in FIG. 1B combined with an objective SIL optical lens of an optical system (not shown), in accordance with one embodiment of the present invention.

FIG. 2A illustrates a cross-sectional view of the configuration of spreader window 100 and thermal exchanger 150 illustrated in FIG. 1B combined with an objective SIL optical lens of an optical system (not shown), in accordance with one embodiment of the present invention. As shown in FIG. 2A, DUT 210 is coupled to heat spreader window 100, which comprises substantially undoped silicon and is optically transparent to IR wavelengths. As such, thermal energy generated from DUT 210 while under power is transferred to heat spreader window 100.

In addition, heat spreader window 100 is coupled to heat conductive plating 125. Heat conductive plating 125 is coupled to heat exchanger 150 for purposes of transferring thermal energy from heat spreader window 100 to heat exchanger 150. As shown, thermal energy is removed from heat exchanger 150 through a cooling medium circulating through channel 170.

In addition, FIG. 2A illustrates the configuration of DUT 210, heat spreader window 100, and SIL objective lens 220. In particular, heat exchanger 150 comprises an opening to allow for entry of an objective lens of an optical system to view or make contact with heat spreader window 100.

Figure 2B:
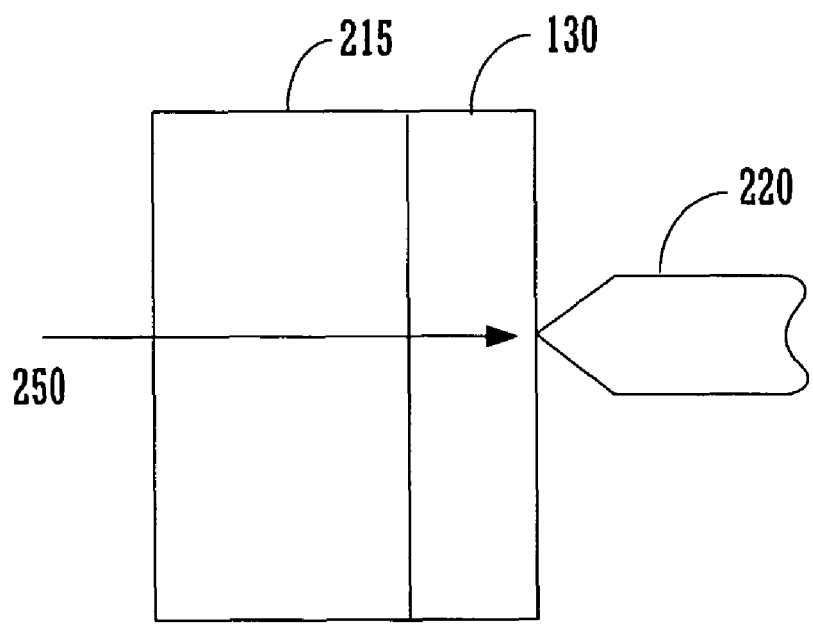
FIG. 2B is a block diagram illustrating the configuration of a device under test (DUT), a substantially undoped silicon heat spreader window, and an solid immersion lens (SIL) of an SIL optical system, in accordance with one embodiment of the present invention.

FIG. 2B is a detailed view of the configuration of (DUT) 210, substantially undoped heat spreader window area 130 of silicon heat spreader window 100, and SIL objective lens 220 of an SIL optical system, in accordance with one embodiment of the present invention. As shown in FIG. 2B, a substrate 215 of the DUT is coupled to window area 130. Also, heat spreader window area 130 is coupled to SIL objective lens 220.

In accordance with one embodiment, substrate 215, heat spreader window area 130, and SIL objective lens 220 each comprise silicon. That is, each of substrate 215, heat spreader window area 130, and SIL objective lens 220 is made from essentially the same material, silicon. In one embodiment, the silicon is doped similarly in each of substrate 215, heat spreader window area 130, and SIL objective lens 220. In another embodiment, the doping concentrations of silicon in substrate 215, heat spreader window area 130 of heat spreader window 100, and SIL objective lens 220 are not identical.

More particularly, the indexes of refraction for DUT 210, heat spreader window area 130 of heat spreader window 100, and SIL objective lens 220 are substantially identical. That is, since the material comprising each of substrate 215, heat spreader window area 130, and SIL objective lens 220 is silicon, their corresponding indexes of refraction are also substantially similar. In particular, the use of un-doped silicon in heat spreader window area 130 creates an IR transparent window area 130 with the same index of refraction as the silicon in substrate 215, and SIL objective lens 220 so that index mismatches that would cause optical aberration are avoided, in accordance with one embodiment of the present invention.

Specifically, heat spreader window area 130 comprises a first index of refraction. The first index of refraction of the heat spreader window area 130 is substantially identical to a second index of refraction of substrate 215 of DUT 210. In addition, the first index of refraction of heat spreader window area 130 is substantially identical to a third index of refraction of SIL objective lens 220 of the SIL optical system. As shown in FIG. 2B, SIL objective lens 220 is configured for contact with heat spreader window area 130 to minimize the effects of air coupling. As such, energy 250 (e.g., IR light) from DUT 210 passes from substrate 215, through heat spreader window area 130, and to SIL objective lens 220 with minimal loss of energy. That is, energy 250 passes from substrate 215, to heat spreader window area 130 and to SIL objective lens 220 with minimal refraction or bending of the light waves associated with energy 250.

Figure 3:
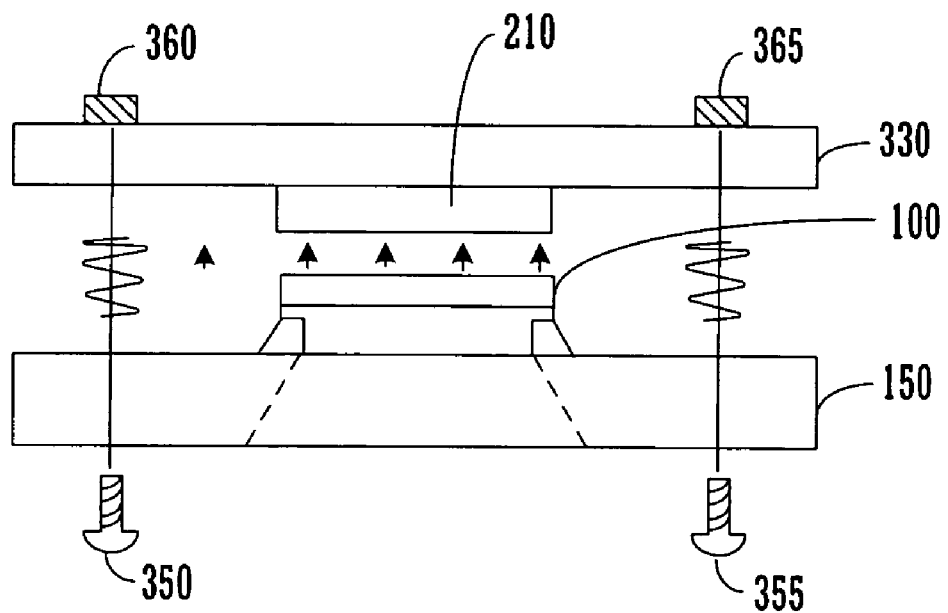
FIG. 3 is a system diagram of the implementation of a substantially undoped silicon heat spreader window with a heat exchanger for thermal management of a DUT, in accordance with one embodiment of the present invention.

FIG. 3 is a diagram of a system 300 implementing the substantially undoped silicon heat spreader window 100 with a heat exchanger 150 for thermal management of a DUT 320, in accordance with one embodiment of the present invention. As shown, system 300 is capable of bringing heat spreader window 100 in contact with the DUT. For example, as the screws 350 and 355 are tightened with nuts 360 and 365, heat spreader window 100 comes into contact with DUT 210.

Figure 4:
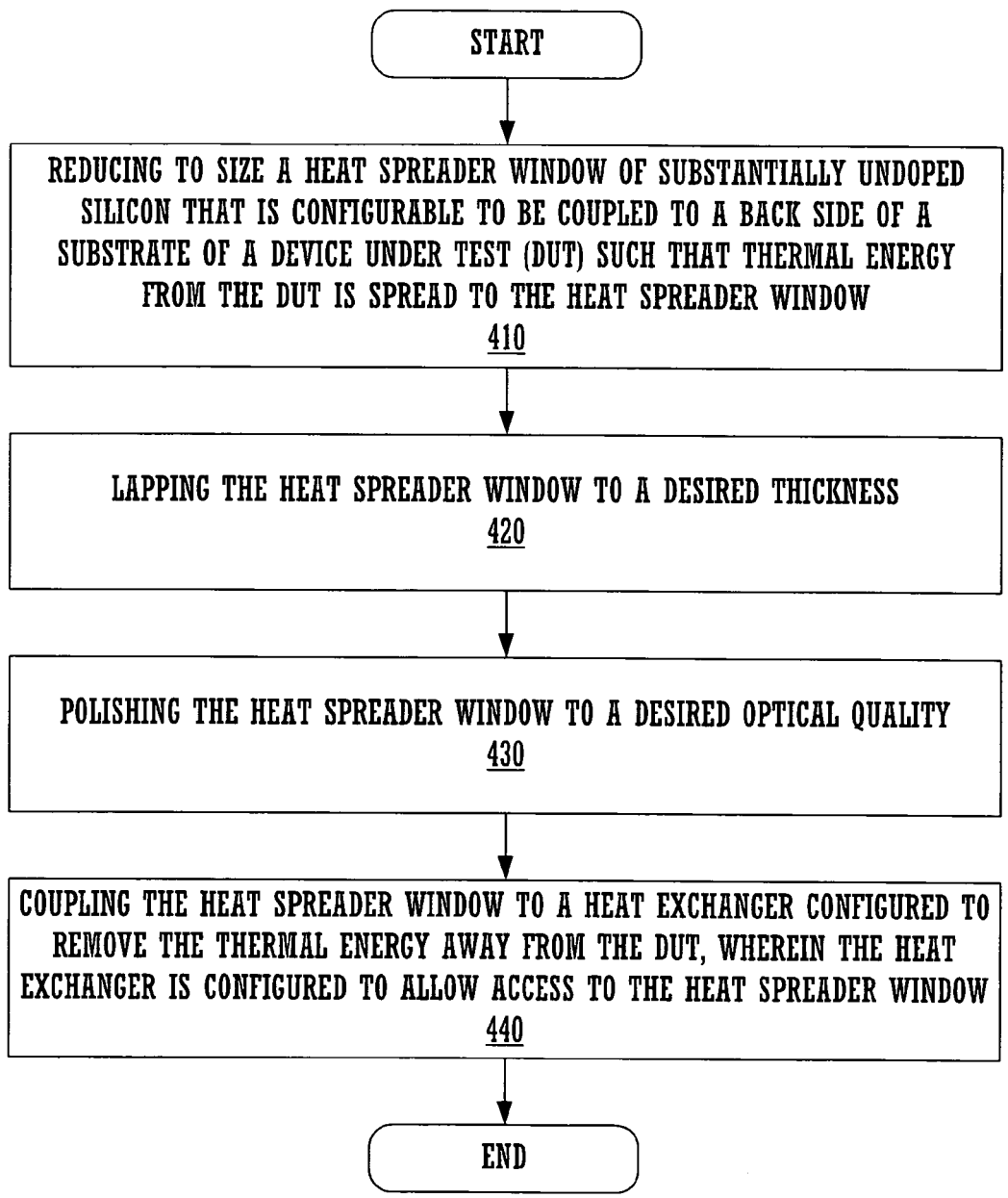
FIG. 4 is a flow chart of a method for producing a heat spreader window, in accordance with one embodiment of the present invention.

FIG. 4 is a flow diagram 400 illustrating steps in a method for generating a heat spreader window for thermal management of a DUT, in accordance with one embodiment of the present invention. The method of FIG. 4 can be implemented to produce heat spreader window area 130 of heat spreader window 100 of FIG. 1A, in one embodiment.

At 410, the present embodiment takes a wafer of substantially undoped silicon and reduces to size a heat spreader window. For example, wafer slicing and cleaving is performed to reduce to size the heat spreader window. The heat spreader window is configurable to be coupled to a back side of a substrate of a DUT. That is, the heat spreader window is designed to maximize contact with the DUT. As such, thermal energy from the DUT is capable of being spread to the heat spreader window.

At 420, the present embodiment laps the heat spreader window to a desired thickness. That is, the wafer surfaces and dimensions are perfected to exacting detail. For instance, the mechanical lapping process grinds and polishes the surfaces of the heat spreader window to the desired thickness. In particular, lapping removes saw marks and surface defects from the surfaces of the heat spreader window. In one embodiment, edge rounding is also performed.

At 430, the present embodiment polishes the heat spreader window to a desired optical quality. That is, further polishing steps are performed on the surfaces of the heat spreader window so that energy (e.g., IR wavelengths) can cleanly pass through the heat spreader window. For instance, one or more surfaces of the heat spreader window are polished to the desired optical quality.

At 440, the present embodiment configures the heat spreader window to be coupled to a heat exchanger. The heat exchanger is configured to remove thermal energy away from the DUT. In particular, a thermally conductive plating is coupled around the heat spreader window to enable thermal coupling of the heat spreader window to a heat exchanger. As such, the thermally conductive plating facilitates removal of the thermal energy from the heat spreader window to the heat exchanger when the heat exchanger is coupled to said heat spreader window through the thermally conductive plating.

In addition, the heat exchanger is configured to allow access to the heat spreader window. For instance, the heat exchanger includes a gap to allow access by an objective optical lens to view or come into contact with the heat spreader window that is coupled to the DUT.

Figure 5:
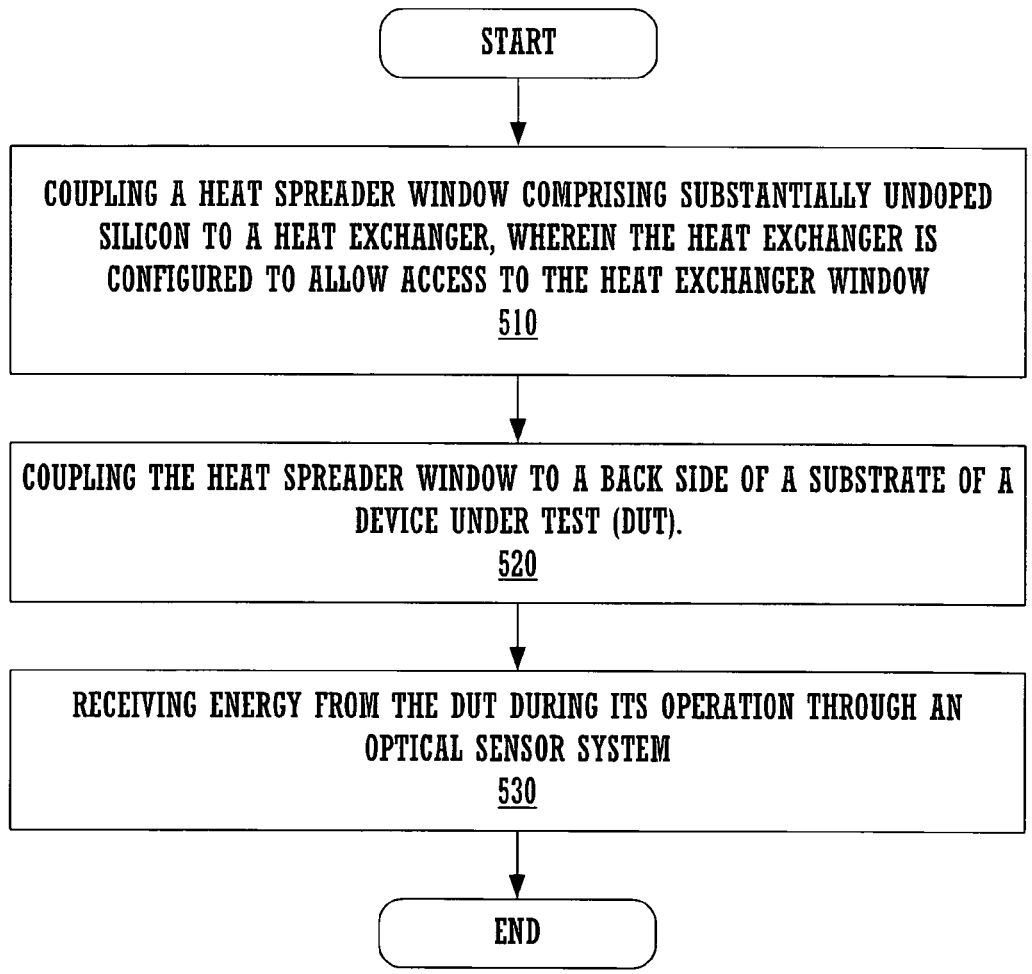
FIG. 5 is a method of thermal management, in accordance with one embodiment of the present invention.

FIG. 5 is a flow diagram 500 illustrating a method of thermal conduction, in accordance with one embodiment of the present invention. The method of flow diagram 500 implements the heat spreader window 100 of FIGS. 1A, 1B, 2A, and 2B for purposes of removing thermal heat from a DUT while under power.

At 510, the present embodiment couples a heat spreader window comprising substantially undoped silicon to a heat exchanger. In particular, the heat exchanger is configured to allow access to the heat spreader window. For instance, the heat exchanger includes a gap to allow access by an objective optical lens to view or come into contact with the heat spreader window that is coupled to the DUT.

At 520, the heat spreader window is coupled to a back side of a substrate of the DUT. In this way, the heat spreader window allows for thermal energy to be transferred from the DUT to the heat spreader window. In addition, in one embodiment, the heat spreader window is also coupled to a heat exchanger, and as such, thermal energy from the DUT is transferred to the heat exchanger, and ultimately removed from the heat exchanger. For instance, a thermally conductive plating is coupled around the heat spreader window. Also, the heat conductive plating is capable of being coupled to the heat exchanger to facilitate removal of the thermal energy from the heat spreader window to the heat exchanger.

In one embodiment, the heat spreader window comprises substantially undoped silicon. In this manner, the heat spreader window is configured such that a first index of refraction of the heat spreader window is substantially similar to a second index of refraction of the substrate. As such, energy from the DUT passes from the DUT and through the heat spreader window without any loss. For instance, IR waves pass from the DUT through the heat spreader window without any refraction.

At 530, the present embodiment receives energy from the DUT during its operation through an optical sensor system. For example, an SIL objective lens of an SIL optical sensor system is coupled to the heat spreader window to receive IR wavelength energy from the DUT. Specifically, the heat spreader window is brought into contact with an SIL objective lens of the optical sensor system.

In addition, the heat spreader window is configured such that the first index of refraction of the heat spreader window is substantially similar to a third index of refraction of the SIL objective lens of the optical sensor system. In one embodiment, the optical sensor system comprises an SIL infrared optical sensor system. As such, energy from the DUT passes from the DUT, through the heat spreader window, and through the SIL objective lens to be received by the optical sensor system with minimal loss. For instance, IR waves pass from the DUT through the heat spreader window, through the SIL objective lens to the SIL optical sensor system with minimal refraction, and with minimal loss of information.

In particular, the use of un-doped silicon in heat spreader window area creates an IR transparent window area with the same index of refraction as the silicon in substrate of the DUT and the SIL objective lens. As such, the effects, such as optical aberrations, of index mismatches between the substrate of the DUT, the heat spreader window, and the SIL objective lens are minimized.

In another embodiment, an air coupled optical lens is capable of receiving the energy from the DUT through the substantially undoped silicon heat spreader window. That is, the heat spreader window is capable of passing energy from the DUT to the air coupled optical lens of an optical sensor system.

In still another embodiment, the heat spreader window that is coupled to the SIL objective lens of an SIL optical sensor system is configured to accommodate spray cooling. That is, spray cooling of the heat spreader window is implemented to facilitate further removal of thermal energy from the DUT. As such, energy from the DUT is capable of passing through the substrate of the DUT, the heat spreader window, and through the SIL objective lens to be received by the SIL optical system while spray cooling is implemented.

Accordingly, embodiments of the present invention disclose systems and methods that provide for thermal management of a DUT through the implementation of a substantially undoped silicon heat spreader window for use with a solid immersion lens (SIL) optical system. Other embodiments of the present invention provide the above accomplishments and also provide for increased efficiency in collecting infrared (IR) signals emitted from the DUT during its operation since the index of refraction of the heat spreader window is substantially identical the substrate of the DUT and the SIL objective lens of the SIL optical system.

While the methods of embodiments illustrated in flow charts 400 and 500 shows specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

What is claimed is:

1. A system for performing optical microscopy, said system comprising:
   a heat spreader window consisting essentially of undoped silicon configured to be coupled to a back side of a substrate of a device under test (DUT) such that thermal energy from said DUT is spread to said heat spreader window; said heat spreader window comprising polished surfaces that allow infrared radiation to cleanly pass through; said heat spreader window further comprising a contact region, wherein said contact region is configurable for contact with a solid immersion lens (SIL) optical system for optical examination of said DUT; and
   a heat exchanger coupled to said heat spreader window for removing said thermal energy from said DUT during its operation, wherein said heat exchanger is configured to allow access to said heat spreader window.

2. The system of claim 1, further comprising:
   a heat conductive plating coupled to said heat spreader window for coupling said heat spreader window to said heat exchanger.

3. The system of claim 1, further comprising:
   an anti-reflective coating (ARC) coupled to said heat spreader window.

4. The system of claim 1, wherein said contact region is configured for contact with a silicon based SIL objective lens.

5. The system of claim 1, wherein said heat spreader window comprises a first index of refraction that is substantially identical to a second index of refraction of said substrate of said DUT.

6. The system of claim 5, wherein said first index of refraction of said heat spreader window is substantially identical to a third index of refraction of an SIL objective lens of said SIL optical system, wherein said contact region is configured for contact with said SIL objective lens.

7. The system of claim 1, further comprising:
   an SIL infrared optical system coupled to said contact region.

8. The system of claim 1, further comprising:
   an air coupled optical system configured to receive energy from said DUT through said heat spreader window.

9. The system of claim 1, wherein a thickness of said heat spreader window is approximately 300 micrometers.

10. The system of claim 2, wherein said a heat conductive plating comprises gold plating.

11. The system of claim 1, further comprising indium solder coupling the heat spreader window to the heat exchanger.

12. The system of claim 1, further comprising spray cooling system.

13. A system for performing optical microscopy of a device under test (DUT), said system comprising:
   a heat spreader window consisting essentially of undoped silicon and having top and bottom polished surfaces that allow infrared radiation to cleanly pass through, wherein the top surface is configured to be coupled to a back side of the DUT such that thermal energy from said DUT is spread to said heat spreader window and said front surface is configured for contact with a solid immersion lens (SIL) optical system for optical examination of said DUT;
   a heat exchanger for removing said thermal energy from said DUT during its operation; and,
   indium solder coupling the heat spreader window to the heat exchanger.

14. The system of claim 13, further comprising a gold plating on the periphery of the heat spreader window.

15. The system of claim 13, further comprising spray cooling system.

* * * * *